(No Model.)

L. B. STITH.
COTTON STALK CHOPPER.

No. 281,577. Patented July 17, 1883.

WITNESSES:
Thos. Houghton.
Solon C. Kemon

INVENTOR:
L. B. Stith
BY Munn & Co
ATTORNEYS.

UNITED STATES PATENT OFFICE.

LEWIS B. STITH, OF GOLDSBOROUGH, NORTH CAROLINA.

COTTON-STALK CHOPPER.

SPECIFICATION forming part of Letters Patent No. 281,577, dated July 17, 1883.

Application filed June 14, 1881. Renewed May 11, 1883. (No model.)

*To all whom it may concern:*

Be it known that I, LEWIS B. STITH, of Goldsborough, in the county of Wayne and State of North Carolina, have invented a new and useful Improvement in Cotton-Stalk Choppers; and I do hereby declare that the following is a full, clear, and exact description of the same, reference being had to the accompanying drawings, forming part of this specification, in which—

Figure 1:
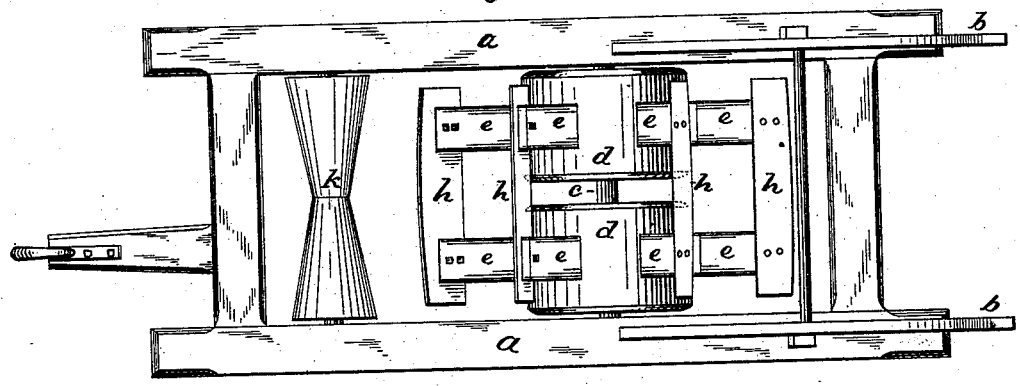
Figure 2:
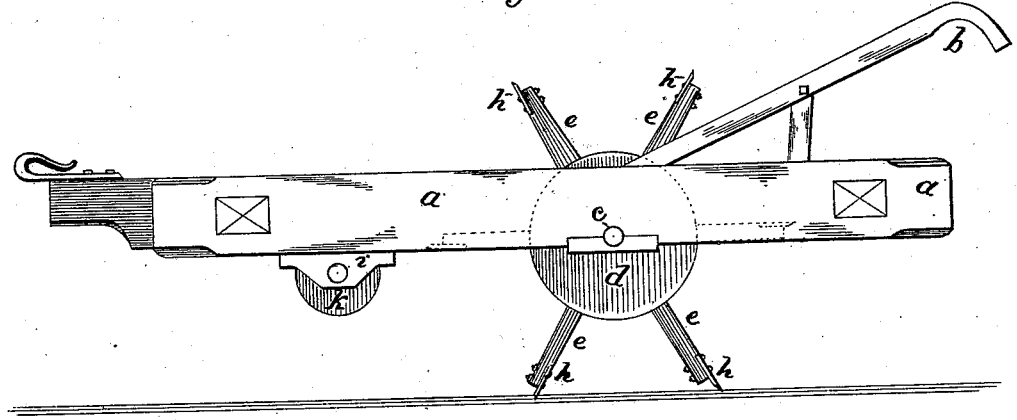

Figure 1 is a plan view of my improved cotton-stalk chopper, and Fig. 2 is a side elevation of the same.

My invention relates to improvements in that class of cotton-stalk choppers intended to cut down all the standing stalks; and it consists of a series of revolving cutters, each of which is attached to the outer ends of two radial arms secured at their inner ends to two hubs centrally secured to an axle journaled in the frame of the machine, and a roller journaled in the frame of the chopper, in front of the revolving cutters, and consisting of two frusta of cones joined together at their smaller ends, and forming, when thus joined together, a single frusto-conical roll, which is employed in the forward movement of the chopper to draw in the cotton-stalks to the cutters, as hereinafter more fully described.

In the accompanying drawings, $a$ represents the frame of my improved chopper, provided near its rear end with the handles $b$, secured to the frame, a horse or other propelling power being applied to the front end of the frame.

$c$ represents an axle journaled in the longitudinal side pieces of the frame, to which are secured the hubs $dd$, the axle $c$ passing through the centers of the hubs.

$ee$ represent a series of arms or short radial spokes radiating from the circumferences of the hubs opposite to each other, and provided at their outer ends with recesses for the reception of cutters $h\,h$, secured to the arms $ee$, and having preferably convex edges, each opposite pair of arms $ee$ being connected by a cutter.

$i\,i$ are blocks bolted to the under faces of the longitudinal pieces of the frame, and each provided with a journal-bearing in its upper face for the reception of the journals of the roller $k$. The roller $k$ is of peculiar construction, and consists of two frusta of cones joined together at their smaller ends, the junction of the two frusta lying in or nearly in the central longitudinal line of the chopper, and forming, when joined together, the single frusto-conical roll $k$ without any obstruction on its outer surface. By this construction, in the forward movement of the chopper, the roller $k$ is revolved, and the cotton-stalks are drawn in toward the central longitudinal line of the chopper, to be cut off by the revolving knives, the chopper being propelled along a row of cotton-stalks.

It will be observed that in the operation of my improved chopper the upper ends of the cotton-stalks are drawn in toward the central longitudinal line of the chopper by the frusta-conical roll, and that the cotton-stalks, in being thus drawn in toward the central line, are presented to the cutters obliquely, so that the cutters make an oblique cut of the stalks—a cut well known to be much more effective in severing the stalks than a cross-cut, or a cut at right angles to the stalks. There is therefore a coaction between the frusto-conical roll and cutters, in that the roll draws in the stalks to be operated on by the cutters, and at the same time there is a further coaction between the frusto-conical roll and cutters, in that an oblique and more effective cut of the stalks is produced in contradistinction to a direct cross-cut of the stalks. Where the cotton-stalks are large, two such frames provided with two sets of cutters and two rollers formed as described may be propelled along a row.

I am aware that a stalk-cutter has heretofore been employed in which two frusta of cones on the same shaft and provided with flanges and knives on their peripheries are arranged in front of the main cutting-cylinder and rest on the ground, and are adapted by their shape to conform with the ridges and furrows of the field, and I therefore lay no claim to such construction, my invention being confined, in combination with a stalk-chopper, to a single frusto-conical roll with a smooth outer surface without obstructions thereon, and adapted to revolve above the surface of the ground, whereby the upper ends of the cotton-stalks along a row are drawn to the central line of the machine, which could not occur in the invention disclaimed, because of the flanges and knives on the surfaces of the frusta.

I am also aware that a frusto-conical roller is not new *per se*, and I therefore lay no claim to such form of roller, my invention being confined to the combination and arrangement of parts as pointed out in the claim.

What I claim as my invention is—

The combination, with the frame *a*, axle *c*, hubs *d d*, having radial arms *e e*, and cutters *h h*, of the frusto-conical roll *k*, journaled in the frame in front of the revolving stalk-cutter and above the ground, and provided with a smooth unobstructed outer surface, whereby in the forward movement of the stalk-chopper the tops of the stalks are drawn in toward the central longitudinal line of the chopper, and an oblique cut of the stalks is effected, substantially as described.

L. B. STITH.

Witnesses:
R. D. HOLT,
GEO. W. DEWEY.